United States Patent
Brugger

(10) Patent No.: US 10,413,981 B2
(45) Date of Patent: Sep. 17, 2019

(54) DEVICE FOR CUTTING A WORKPIECE ALONG A CUTTING LINE

(71) Applicant: Hilti Aktiengesellschaft, Schaan (LI)

(72) Inventor: Peter Brugger, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 372 days.

(21) Appl. No.: 14/767,793

(22) PCT Filed: Feb. 18, 2014

(86) PCT No.: PCT/EP2014/053063
§ 371 (c)(1),
(2) Date: Aug. 13, 2015

(87) PCT Pub. No.: WO2014/128095
PCT Pub. Date: Aug. 28, 2014

(65) Prior Publication Data
US 2015/0375318 A1    Dec. 31, 2015

(30) Foreign Application Priority Data

Feb. 20, 2013  (DE) .................. 10 2013 202 754

(51) Int. Cl.
*B23D 59/00* (2006.01)
*B28D 1/04* (2006.01)
(Continued)

(52) U.S. Cl.
CPC ......... *B23D 59/001* (2013.01); *B23D 59/008* (2013.01); *B28D 1/045* (2013.01);
(Continued)

(58) Field of Classification Search
CPC .... B23D 59/001; B23D 59/008; B28D 1/045; B28D 7/005; G05B 19/19; G05B 2219/37355; G05B 2219/37372
See application file for complete search history.

(56) References Cited

U.S. PATENT DOCUMENTS 5,788,428 A * 8/1998 Ward .................. B23Q 5/10
                                                        318/566
6,152,803 A   11/2000 Boucher et al.
(Continued)

FOREIGN PATENT DOCUMENTS

BY          11931 C1     6/2009
DE          19823756     12/1999
(Continued)

*Primary Examiner* — Stephen Choi
(74) *Attorney, Agent, or Firm* — Davidson, Davidson & Kappel, LLC

(57) ABSTRACT

A device for cutting a workpiece along a cutting line between a first end point and a second end point including a saw head, comprising an advancing mechanism with a guide carriage and with an advancing motor. The saw head is arranged on the guide carriage movable along an advancing direction, including a sensor system with a sensor element for monitoring the saw head, the advancing mechanism or the work process, including a control unit with a control element to control the saw head, the advancing mechanism and the sensor system as well as an evaluation element to evaluate a measured quantity detected by the sensor system, including an operating device to operate the saw head and the advancing mechanism, and including a display. On the basis of the measured quantity, the control unit calculates the momentary work result which is shown on the display.

7 Claims, 2 Drawing Sheets

(51) Int. Cl.
  *B23Q 17/22*    (2006.01)
  *B28D 7/00*     (2006.01)
  *G05B 19/19*    (2006.01)

(52) U.S. Cl.
  CPC ............. *B28D 7/005* (2013.01); *G05B 19/19* (2013.01); *G05B 2219/37355* (2013.01); *G05B 2219/37372* (2013.01)

(56) References Cited

U.S. PATENT DOCUMENTS

| | | | |
|---|---|---|---|
| 7,170,076 B2 | 1/2007 | Butler | |
| 2003/0060022 A1 | 3/2003 | Peng et al. | |
| 2006/0189258 A1 | 8/2006 | Schaer et al. | |
| 2006/0243350 A1 | 11/2006 | Chang | |
| 2007/0194617 A1* | 8/2007 | Moller | B23D 59/001 299/1.5 |
| 2009/0044680 A1 | 2/2009 | Elhaus | |
| 2011/0015772 A1 | 1/2011 | Salazar | |
| 2011/0056084 A1 | 3/2011 | Okada et al. | |
| 2011/0056716 A1 | 3/2011 | Jonsson et al. | |
| 2011/0203565 A1 | 8/2011 | Hilsgen | |
| 2013/0180371 A1* | 7/2013 | Flock | B28D 1/044 83/13 |
| 2015/0151451 A1 | 6/2015 | Flock | |

FOREIGN PATENT DOCUMENTS

| | | |
|---|---|---|
| DE | 102005000013 | 8/2006 |
| DE | 102006011131 | 9/2007 |
| DE | 102011089878 | 6/2013 |
| EP | 1693173 | 8/2006 |
| JP | 2005-111855 | 4/2005 |
| RU | 2050259 | 12/1995 |
| SU | 543334 | 1/1977 |

* cited by examiner

DEVICE FOR CUTTING A WORKPIECE ALONG A CUTTING LINE

The present invention relates to a device for cutting a workpiece along a cutting line.

BACKGROUND

Prior-art devices configured as wall saws for cutting a workpiece along a cutting line consist of a guide rail, a saw head that is arranged so as to be movable on the guide rail, and a motor-driven advancing mechanism to move the saw head along the guide rail. The saw head comprises a saw blade that is attached to a saw arm and that is driven around a rotational axis by a drive motor. The saw arm is configured so that it can be swiveled around a swivel axis by a swivel motor. The drive motor and the swivel motor are arranged in a device housing of the saw head. The motor-driven advancing mechanism comprises a guide carriage and an advancing motor that is arranged in the device housing of the saw head. The saw head is installed on the guide carriage and configured so that it can be moved by the advancing motor along the guide rail in the advancing direction. Aside from the motors, there is also a control unit that is installed in the device housing and that serves to control the wall saw.

Wall saws are operated either manually or in a process that is at least partially automated. In manual processes for cutting a workpiece along a cutting line, the operator has to approach the end points of the cutting line by manually controlling the motor-driven advancing mechanism during the processing. If the saw blade is surrounded by a blade guard, the exit points of the saw blade in the workpiece are hardly or not at all visible to the operator, so that the operator cannot determine the end points of a cutting line during the work process. The operator receives only a limited amount of information about the momentary work result. The momentary cutting depth of the saw blade in the workpiece can be read, for example, on a scale that is present on the blade guard. A drawback here is that the momentary cutting depth is not displayed in the case of cuts that are made without a blade guard. The blade guard, like the entire saw head, often becomes very dirty during the work process, so that the legibility of the scale can be further impaired. Moreover, during the work process, the operator has to maintain a certain safety distance from the wall saw, as a result of which the legibility of the scale can be even more limited, particularly in the case of horizontal cuts.

European patent application EP 1 693 173 A1 discloses a method that is at least partially automated in order to cut a workpiece along a cutting line, and it also discloses a wall saw that is suitable for carrying out said method. Aside from the usual components, the wall saw also comprises a sensor system having a swivel-angle sensor and a position sensor, whereby the swivel-angle sensor monitors the swivel angle of the saw arm, while the position sensor monitors the position of the saw head on the guide rail. This prior-art method for cutting a workpiece entails a sequence of three method steps that are carried out one after the other. In the first method step, the saw arm is slanted at a swivel angle that corresponds to the depth of the partial cut. In the second method step, the saw head is moved forward along the guide rail along the advancing direction until it reaches the first end point of the cutting line. In the third method step, the saw head is moved backwards along the guide rail along the advancing direction until it reaches the second end point of the cutting line. The cut is made in several partial cuts. These three method steps are continuously repeated until the desired cutting depth has been reached. The automated cutting method is intended to free the operator of some routine procedures so that he/she can concentrate on monitoring the work process. How the operator is supposed to monitor the work process is not disclosed.

It is an object of the present invention to provide a device for cutting a workpiece in such a way as make it easier for the operator to monitor the work process.

The present invention provides that on the basis of the measured quantities detected by the sensor system, the control unit calculates the momentary work result, and the momentary work result is shown on the display means. The momentary work result can be shown on the display means as a numerical value and/or in graph form. The operator can monitor the work process on the basis of the calculated momentary work result. In the case of a manual process, especially the momentary cutting depth of the saw blade and the position of the end points are the suitable quantities for monitoring the work process. All of the information about the work result that can be calculated on the basis of the measured quantities of the sensor system as well as of other known device parameters can be shown on the display means.

Preferably, the control unit has a memory element and it stores the measured quantities detected by the sensor system as well as the momentary work result in said memory element. If the measured quantities of the sensor system and the calculated momentary work result are stored in the memory element, the control unit can calculate additional characteristic values in order to monitor the work process, or else it can display the progress of the work process in graph form.

Especially preferably, on the basis of the measured quantities stored in the memory element and on the basis of the momentary work results, the control unit calculates additional characteristic values for the work process and shows these additional characteristic values on the display means. The additional characteristic values for the work process can be shown on the display means as a numerical value and/or in graph form. Aside from the momentary cutting depth of the saw blade in the workpiece, for example, the course of the cut in the workpiece is also of interest to the operator. The additional characteristic values for the work process include the main cutting depths, the positions of the end points of the cut and the length of the cut.

In a preferred embodiment, a remote control unit is provided that comprises the operating means and the display means and that is connected to the control unit via a communication connection. Showing the momentary work result on the remote control unit has the advantage that the operator can monitor the work process on the basis of the calculated momentary work results and of the additional characteristic values. During the work process, the operator holds the remote control unit in his/her hand and receives on the display means all of the information that is needed for monitoring the work process.

Especially preferably, the control unit comprises a first control unit and a second control unit, whereby the first control unit is arranged in the saw head, while the second control unit is arranged in the remote control unit. The operator can set the desired device and operating parameters using the operating means of the remote control unit. The second control unit converts the device and operating parameters into corresponding control commands for the saw head and for the motor-driven advancing mechanism. The control commands are transmitted by the second control unit to the first control unit via the communication connection. The first control unit gives the control commands to the saw head and to the motor-driven advancing mechanism.

In a preferred variant, the momentary work result is calculated in the first control unit, which is arranged in the saw head. The calculation and display of the momentary work result are supposed to take place in real time, so that the operator can monitor the work process on the basis of the momentary work result and can intervene in the work process if necessary. The shorter the transmission paths of the measured data, the shorter the time delay. The calculation of the momentary work result in the first control unit entails the advantage that only the work results that have to be shown on the display means are transmitted to the remote control unit via the communication connection.

In an alternative preferred variant, the first control unit transmits the measured quantities detected by the sensor system to the second control unit, and the momentary work result is calculated in the second control unit. The transmission of the measured quantities via the communication connection to the second control unit, which is arranged in the remote control unit, lends itself whenever the application calls for a special remote control unit and cannot be carried out with just any remote control unit.

Embodiments of the invention will be described below with reference to the drawing. The drawing does not necessarily depict the embodiments true-to-scale, but rather, the drawing—where necessary for the sake of explanation—is shown in schematic and/or slightly distorted form. Regarding any additions to the teaching that can be gleaned directly from the drawing, reference is hereby made to the pertinent state of the art. Here, it should be kept in mind that many modifications and changes relating to the shape and to details of an embodiment can be made without departing from the general idea of the invention. The features of the invention disclosed in the description, in the drawing as well as in the claims can be essential for the refinement of the invention, either individually or in any desired combination. Moreover, all combinations of at least two of the features disclosed in the description, in the drawing and/or in the claims fall within the scope of the invention. The general idea of the invention is not limited to the exact form or detail of the preferred embodiment shown and described below nor is it limited to a subject matter that would be limited in comparison to the subject matter put forward in the claims. At given rated ranges, values that fall within the specified limits are also disclosed as limit values and can be used and claimed as desired. For the sake of clarity, identical or similar parts or else parts with an identical or similar function are designated by the same reference numerals below.

BRIEF DESCRIPTION OF THE DRAWINGS

The following is shown.

DETAILED DESCRIPTION

Figure 1:
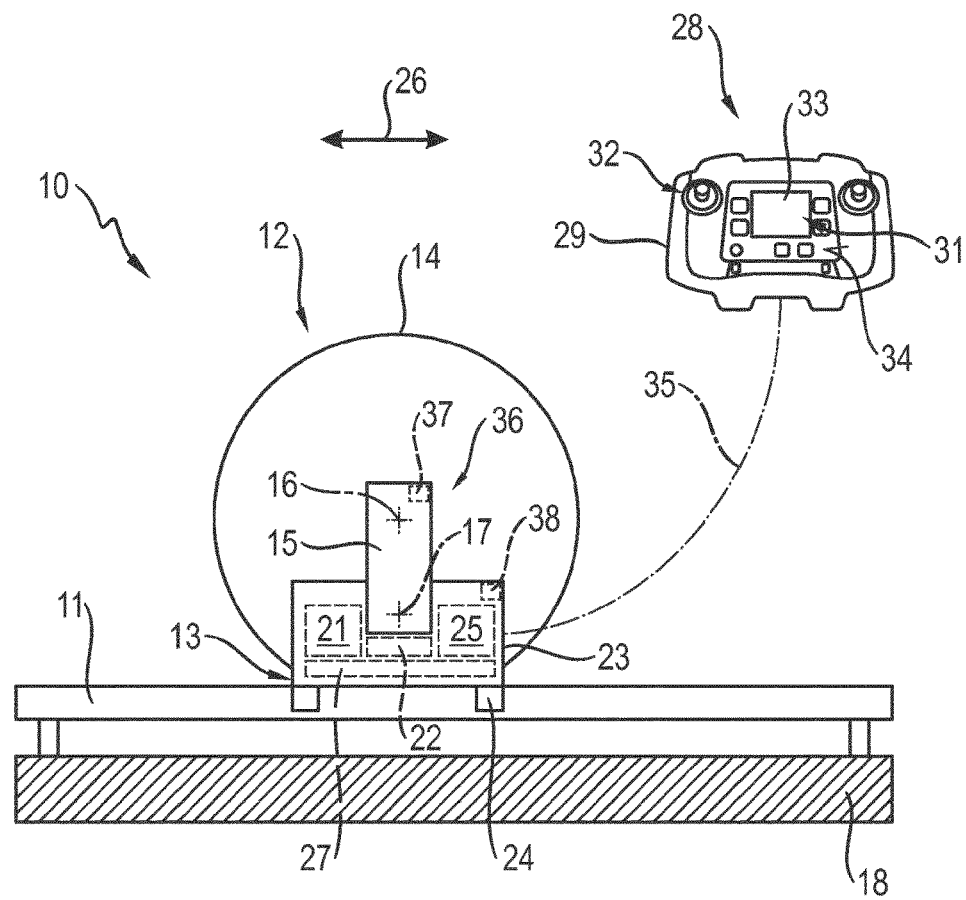
FIG. 1: a rail-guided device system for cutting a workpiece, consisting of a guide rail, a saw head that is arranged so as to be movable on the guide rail, and a motor-driven advancing mechanism to move the saw head along the guide rail.

FIG. 1 is a schematic view of a rail-guided device system 10, consisting of a guide rail 11, a power tool 12 that is arranged so as to be movable on the guide rail 11, and a motor-driven advancing mechanism 13 to move the power tool 12 along the guide rail 11.

The power tool is configured as a saw head 12 and it comprises a saw blade 14 that is attached to a saw arm 15 and that is driven around a rotational axis 16. The saw arm 15 is configured so that it can be swiveled around the swivel axis 17. The cutting depth of the saw blade 14 is varied by a swiveling movement of the saw arm 15 around the swivel axis 17. The swivel angle of the saw arm 15, together with the diameter of the saw blade 14, determines how deep the saw blade 14 plunges into the workpiece 18 that is to be processed. As an alternative to the swiveling movement of the saw arm 15 around the swivel axis 17, the saw arm 15 can be adjusted, for instance, by means of a linear drive or another such drive unit. In order to protect the operator, the saw blade 14 can be surrounded by a blade guard that is attached to the saw arm 15 by means of a blade guard holder.

The saw blade 14 is rotated around the rotational axis 16 by a drive motor 21, while the saw arm 15 is swiveled around the swivel axis 17 by a swivel motor 22. The drive motor 21 and the swivel motor 22 are arranged in a device housing 23 of the saw head 12. The motor-driven advancing mechanism 13 comprises a guide carriage 24 and an advancing motor 25 that is arranged in the device housing 23. The saw head 12 is installed on the guide carriage 24 and configured so as to be movable by the advancing motor 25 along the guide rail 11 in an advancing direction 26. The device housing 23 accommodates not only the motors 21, 22, 25, but also a first control unit 27 to control the saw head 12 and the motor-driven advancing mechanism 13.

The device system 10 is operated by means of a control unit 28 which, in the embodiment shown in FIG. 1, is configured as a remote control unit. The remote control unit 28 comprises a device housing 29, a second control unit 31 accommodated in the device housing 29 as well as an operating means 32 and a display means 33 that are arranged on the top 34 of the device housing 29. The second control unit 31 is connected to the first control unit 27 via a communication connection 35. The communication connection 35 is configured as a hard-wired connection or else as a wireless communication connection, for example, in the form of an infrared, Bluetooth, WLAN or Wi-Fi connection. Aside from the listed wireless connection technologies, all familiar and future wireless connection technologies for data transmission are suitable.

The device system 10 has a sensor system 36 with several sensor elements in order to monitor the device system 10 and the work process. A first sensor element 37 is configured as a swivel-angle sensor, while a second sensor element 38 is configured as a position sensor. The swivel-angle sensor 37 measures the momentary swivel angle $\alpha$ of the saw arm 15. The swivel angle of the saw arm 15, together with the diameter of the saw blade 14, determines how deep the saw blade 14 plunges into the workpiece 18. The position sensor 38 measures the momentary position X of the saw head 12 on the guide rail 11. The measured quantities a, X are transmitted to the first control unit 27 by the swivel-angle sensor 37 and by the position sensor 38.

Figure 2:
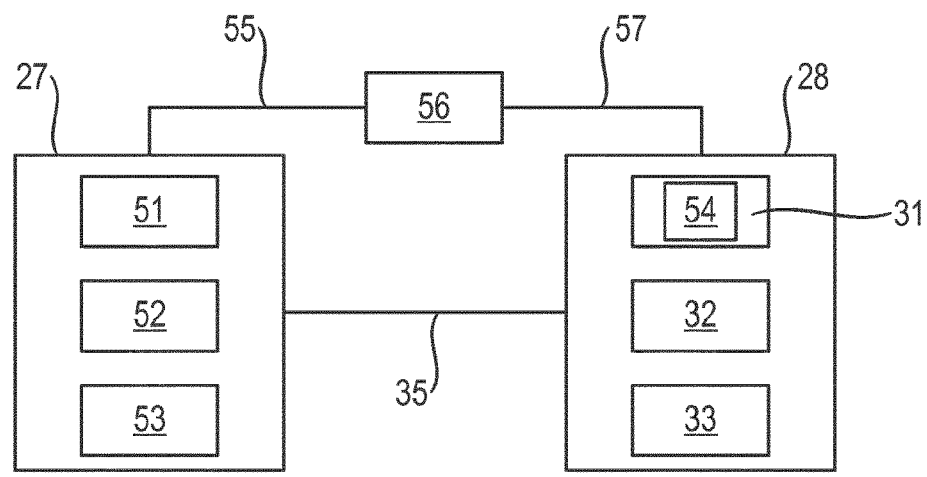
FIG. 2: the interaction between a first control unit arranged in the saw head and a remote control unit of the device system shown in FIG. 1, in the form of a flow chart.

FIG. 2 shows the interaction between the first control unit 27 of the device system 10 and the remote control unit 28 in the form of a flow chart.

The first control unit 27 serves to control the saw head 12, the motor-driven advancing mechanism 13, and the sensor system 36. The first control unit 27 comprises a control element 51 and an evaluation element 52. The saw head 12, the motor-driven advancing mechanism 13, and the sensor system 36 are controlled by the control element 51. The evaluation element 52 serves to evaluate the measured quantities that were detected by the sensor system 36 during the work process. Aside from the control and evaluation elements 51, 52, the first control unit 27 has a memory element 53 where the measured quantities detected by the sensor system 36 can be stored.

The operator sets the desired device and operating parameters by means of the operating means 32 of the remote control unit 28. The second control unit 31 converts the device and operating parameters into corresponding control commands for the saw head 12 and for the motor-driven advancing mechanism 13. In this context, the term "control command" encompasses all of the commands of a control unit that serve to control components of the device. The control commands are transmitted by the second control unit 31 to the first control unit 27 via the communication connection 35. The control element 51 of the first control unit 27 issues the control commands to the saw head 12 and to the motor-driven advancing mechanism 13.

During the processing, the saw head 12, the motor-driven advancing mechanism 13, and the work process are monitored by the sensor system 36. The sensor elements 37, 38 of the sensor system 36 detect several measured quantities, whereby the measured quantities can be detected continuously (analog) or at a sampling frequency (digital). In the embodiment of FIG. 1, the swivel-angle sensor 37 detects the swivel angle α of the saw arm 15, while the position sensor 38 detects the position X of the saw head 12. The detected measured quantities are transmitted by the sensor elements 37, 38 to the evaluation element 52 of the first control unit 27. On the basis of the detected measured quantities a, X as well as on the basis of other device parameters such as the diameter of the saw blade 14, the evaluation element 52 calculates a momentary work result of the work process. The plunging depth of the saw blade 14 into the workpiece can be calculated, for instance, on the basis of the swivel angle α of the saw arm 15 and on the basis of the diameter of the saw blade 14.

The calculated, momentary work result is transmitted to the second control unit 31 via the communication connection 35 and shown on the display means 33 of the remote control unit 28. The momentary work result can be shown as a numerical value and/or in graph form. The operator can monitor the work process on the basis of the momentary work results. In the case of a manual method, especially the plunging depth of the saw blade 14 into the workpiece 18—which corresponds to the momentary cutting depth—as well as the position of the end points constitute suitable quantities for monitoring the work process. All of the information about the work result that can be calculated on the basis of the measured quantities of the sensor system 36 can be shown on the display means 33 of the remote control unit 28.

The detected measured quantities a, X and the momentary work results calculated on their basis can be stored in a memory element 53 of the first control unit 27. As an alternative, the measured quantities a, X and the momentary work results can be stored in a memory element 54 of the second control unit 31. On the basis of the momentary work results, the second control unit 31 can calculate additional characteristic values for the monitoring of the work process, or else it can display the progress of the work process in graph form. Aside from the momentary plunging depth of the saw blade 14 into the workpiece 18, for example, the course of the cut in the workpiece 18 is also of interest to the operator.

In the embodiment of FIG. 2, the momentary work result is calculated in the evaluation element 52 of the first control unit 27. As an alternative, the measured quantities a, X of the sensor system 36 can be transmitted to the second control unit 31 via the communication connection 35, while the evaluation of the momentary work result takes place in the second control unit 31. The measured quantities a, X and the momentary work results calculated on their basis are stored in a memory element 54 of the second control unit 31.

The first control unit 27 can be connected to an additional display means 56 via an additional communication connection 55. In this embodiment, it is advantageous for the momentary work result to be calculated in the first control unit 27 and for the calculated work result to be subsequently transmitted by the first control unit 27 to the connected display means 33, 56. The time delay between the calculation and the display on the display means 33, 56 is reduced. If the momentary work result is calculated in the second control unit 31, the additional display means 56 should be connected to the remote control unit 28 via an additional communication connection 57.

Figure 3:
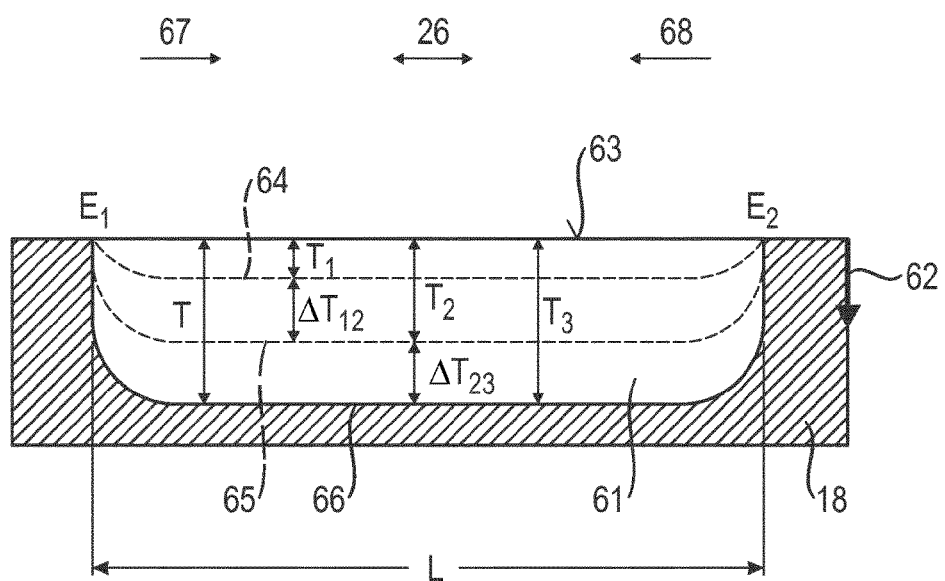
FIG. 3: a workpiece in which a cut has been made in three partial cuts using the device system of FIG. 1.

FIG. 3 shows the workpiece 18 in which a cut 61 is made by means of the device system 10 of FIG. 1. The cut 61 has a depth T in the depth direction 62, and it runs in the advancing direction 26 along a cutting line 63 between a first end point $E_1$ and a second end point $E_2$. The cut 61 is made in three partial cuts 64, 65, 66. The first partial cut 64 is referred to as the guiding cut, the second partial cut 65 as the first main cut and the third partial cut 66 as the second main cut.

The first partial cut 64 has a first depth $T_1$ that corresponds to a first swivel angle $α_1$ of the saw arm 15, and it is created in a forward direction 67 between the first and second end points $E_1$, $E_2$. The second partial cut 65 has a second depth $T_2$ that corresponds to a second swivel angle $α_2$ of the saw arm 15, and it is created in a backward direction 68 between the first and second end points $E_1$, $E_2$, whereby the backward direction 68 runs opposite to the forward direction 67. The third partial cut 66 has a third depth $T_3$ that corresponds to a third swivel angle $α_3$ of the saw arm 15, and it is created in the forward direction 67 between the first and second end points $E_1$, $E_2$. After the third partial cut 65, the cut 61 in the workpiece 18 is finished.

The depths $T_1$, $T_2$, $T_3$ of the partial cuts 64, 65, 66 can be calculated on the basis of the swivel angles $α_1$, $α_2$, $α_3$ of the saw arm 15 that are detected by the swivel-angle sensor 37 and on the basis of the diameter of the saw blade 14. On the basis of the cutting depths $T_1$, $T_2$, $T_3$, main cutting depths can be determined by taking a difference; a first main cutting depth $ΔT_{12}$ results as the difference between the first and second cutting depths $T_2$-$T_1$, while a second main cutting depth $ΔT_{23}$ results from the difference between the second and third cutting depths $T_3$-$T_2$. The positions of the end points $E_1$, $E_2$ can be calculated on the basis of the positions of the saw head 12 detected by the position sensor 38, on the basis of the diameter of the saw blade 14, and on the basis of the swivel angle α of the saw arm 15. The length L of the cut 61 results from the distance between the first end point $E_1$ and the second end point $E_2$.

All of the pieces information shown in FIG. 3 about the cut 61 or about the partial cuts 64, 65, 66 that are calculated on the basis of the measured quantities of the sensor system 36 can be shown on the display means 33 of the remote control unit 28. The measured quantities of the sensor system 36, the momentary work results and additional characteristic values can be shown on the display means as a numerical value and/or in graph form. The momentary work results calculated on the basis of the measured quantities of the sensor system 36 especially include the cutting depths $T_1$, $T_2$, $T_3$ of the saw blade 14. The additional characteristic quantities include the main cutting depths $\Delta T_{12}$, $\Delta T_{23}$, the positions of the end points $E_1$, $E_2$ of the cut 61 and the length L of the cut 61.

What is claimed is:

1. A device for cutting a workpiece along a cutting line between a first end point and a second end point, comprising:
   a saw head with a drive motor and a saw blade being attached to a saw arm and rotatable around a rotational axis by the drive motor, the saw arm being swivelable around a swivel axis;
   an advancing mechanism with a guide carriage and an advancing motor, the saw head being arranged on the guide carriage and movable along a guide rail in an advancing direction by the advancing motor;
   a sensor system with at least one sensor element for monitoring the saw head, the advancing mechanism or a work process, wherein the sensor system comprises a first sensor element configured as a swivel-angle sensor and measuring a momentary swivel angle of the saw arm, and a second sensor element configured as a position sensor and measuring a momentary position of the saw head;
   a control unit with a control element to control the saw head, the advancing mechanism and the sensor system as well as an evaluation element to evaluate at least one measured quantity detected by the sensor system;
   operating means to operate the saw head and the advancing mechanism; and
   a display means;
   wherein on the basis of the measured momentary swivel angle of the saw arm detected by the swivel-angle sensor and momentary position of the saw head detected by the position sensor, the control unit calculates a momentary work result of the work process, and the calculated momentary work result is shown on the display means.

2. The device according to claim 1 wherein the control unit has a memory storing the measured quantities detected by the sensor system as well as the momentary work result.

3. The device as recited in claim 2 wherein, on the basis of the measured quantities stored in the memory and on the basis of the momentary work results, the control unit calculates additional characteristic values for the work process and shows them on the display means.

4. The device as recited in claim 1 wherein a remote control unit includes an operator input and the display means is connected to the control unit via a communication connection.

5. The device as recited in claim 4 wherein the control unit includes a first control unit and a second control unit, the first control unit being arranged in the saw head, and the second control unit being arranged in the remote control unit.

6. The device as recited in claim 5 wherein the momentary work result is calculated in the first control unit.

7. The device as recited in claim 5 wherein the first control unit transmits the measured quantities detected by the sensor system to the second control unit, and the momentary work result is calculated in the second control unit.

* * * * *